UNITED STATES PATENT OFFICE.

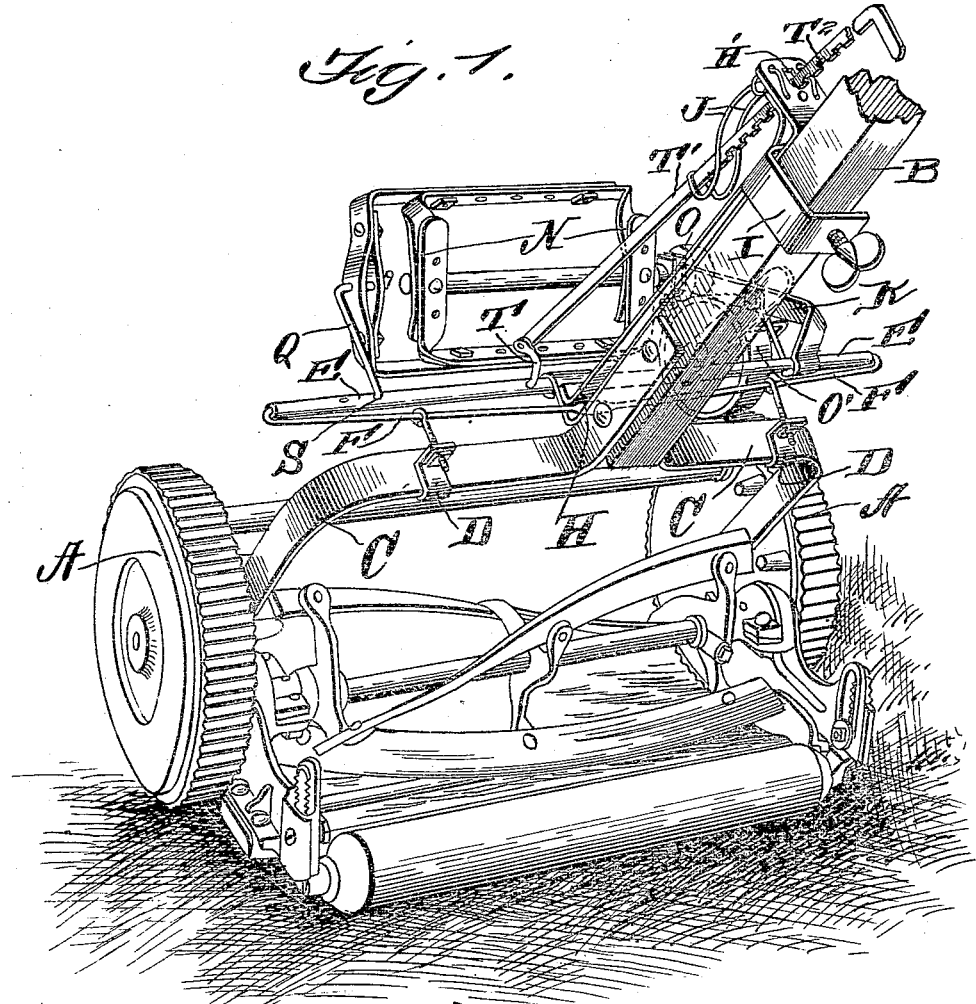

OSCAR S. TUTTLE, OF RANDOLPH, NEW YORK.

ATTACHMENT FOR LAWN-MOWERS.

No. 931,527.     Specification of Letters Patent.     Patented Aug. 17, 1909.

Application filed May 17, 1909. Serial No. 496,579.

*To all whom it may concern:*

Be it known that I, OSCAR S. TUTTLE, a citizen of the United States, residing at Randolph, in the county of Cattaraugus and State of New York, have invented certain new and useful Improvements in Attachments for Lawn-Mowers; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in attachments for lawn mowers and comprises an adjustable reel so arranged that it may be thrown into gear with one of the wheels of the mower and cause the reel to rotate and throw high weeds or grass in position to be cut by the blade of the lawn mower.

The invention comprises various details of construction, combinations and arrangements of parts which will be hereinafter fully described and then specifically defined in the appended claims.

My invention is illustrated in the accompanying drawings, in which:—

Figure 1 is a perspective view of my improved apparatus shown as applied to a lawn mower, and Fig. 2 is an enlarged detail view showing the lever mechanism for raising and lowering the reel.

Reference now being had to the details of the drawings by letter, A, A designate the driving wheels of an ordinary lawn mower, B a handle and C a handle bracket connecting the casings of the two wheels and to which clamping members D are fastened.

E designates a rock shaft forming a part of my invention, which has a rod F connected thereto and a frame H supporting said rock shaft, said rod F being bolted or otherwise secured, at a point intermediate its ends, to said frame H. I designates a clamp fastened to said frame and affords means whereby the latter may be clamped to the handle of a lawn mower.

Mounted upon the arm K which is fastened to said rock shaft is a rotatable reel N, said reel being made up of adjustable sections whereby the reel may be extended or contracted accordingly as may be desired. Fixed to the shaft of the reel is a friction wheel O which is driven by frictional contact with the wheel O' journaled in suitable bearings upon said arm.

Q designates an angled rod, one end of which is bent to form a pivotal bearing for the reel and its other end adapted to engage an aperture S in said rock shaft.

Fixed to the rock shaft is a clevis-shaped member T, one end of which is pivotally connected to an operating rod T' which passes through an aperture H' in said frame H and said operating rod is provided with notches T² in the under edge thereof and its free end bent to form a handle. Said notches are adapted to engage over the marginal edge of the aperture H' to hold the rock shaft in different positions, and J designates a spring fastened to the upturned end of the frame H and bearing yieldingly against said rod and adapted to hold the same so that one or the other of the notches will engage the edge of the aperture H'. Said clamping members D, which are fastened to the braces of the rock shaft, are adapted to engage the rod C and coöperate with the clamping member I upon the frame H to securely hold the apparatus upon the frame of the lawn mower.

In operation, the apparatus is fastened to the handle and handle bracket of the lawn mower in the manner shown and, when it is desired to throw the reel into gear, the operator, by raising up slightly upon the operating rod sufficiently to clear the notches from the edge of the aperture H' and by pushing forward upon the rod, may cause the wheel O' to contact with one of the driving wheels of the lawn mower and cause the reel to rotate. When the reel is in operating position, it will be so positioned that tall weeds or grass may be thrown down in proper position to be cut by the lawn mower as the latter is moved over the ground. When it is desired to throw the apparatus out of gear, it may be done by simply reversing the movement of the rod and pulling upon the same, thus causing the shaft to rock and the friction wheel O' to be thrown out of contact with the driving wheel of the lawn mower. As the arm T comes toward the handle, the reel will move backward as will be readily understood.

What I claim to be new is:—

1. An attachment for lawn mowers comprising, in combination with the lawn mower, a handle, a frame clamped to said handle, a rock shaft mounted upon said frame, an arm fixed to said rock shaft, a reel journaled upon said arm, anti-friction wheels carried by the latter and adapted to contact with the driving wheel of the mower, a rod connected to said rock shaft, and means for automatically holding the same in adjusted positions.

2. An attachment for lawn mowers comprising, in combination with the lawn mower, a handle, a frame clamped to said handle, said frame having an aperture therein, a rock shaft journaled upon said frame, a brace rod mounted upon the ends of said shaft and fastened to said frame, fastening means connected to said rod and fastened to the mower, an arm fixed to said rock shaft, a reel journaled upon said arm, anti-friction wheels mounted upon the latter, one of which is adapted to contact with the driving wheel of the mower, a spring-pressed rod fastened to said rock shaft and having notches adapted to engage the edges of the aperture in said frame through which said rod passes.

3. An attachment for lawn mowers comprising, in combination with the lawn mower, a handle, a frame clamped to said handle, said frame being provided with an upturned portion which is apertured, a rock shaft journaled upon said frame, a brace rod mounted upon the ends of said shaft and fastened to said frame, fastening means connected to said rod and fastened to the mower, an arm fixed to said rock shaft, a reel journaled upon said arm, anti-friction wheels mounted upon the latter, one of which is adapted to contact with the driving wheel of the mower, a clevis-shaped member fixed to said rock shaft, a rod pivoted to said member and extending through the aperture in the upturned portion of said frame, said rod having notches in engagement with the edges of said aperture, a spring fastened to said frame and bearing against said rod and adapted to hold the same in an adjusted position.

In testimony whereof I hereunto affix my signature in the presence of two witnesses.

OSCAR S. TUTTLE.

Witnesses:
    Thomas J. Zibble,
    Alberta Tuttle.